United States Patent [19]

Randell

[11] Patent Number: 5,125,087
[45] Date of Patent: Jun. 23, 1992

[54] METHOD OF RESETTING SEQUENCE OF ACCESS TO EXTENDED MEMORY DISRUPTED BY INTERRUPT PROCESSING IN 80286 COMPATIBLE SYSTEM USING CODE SEGMENT REGISTER

[75] Inventor: Scott A. Randell, Kirkland, Wash.

[73] Assignee: Microsoft Corporation, Redmond, Wash.

[21] Appl. No.: 268,392

[22] Filed: Nov. 7, 1988

[51] Int. Cl.⁵ .................... G06F 9/32; G06F 9/44; G06F 12/06
[52] U.S. Cl. .................... 395/425; 364/251.7; 364/255.5; 364/262.9; 364/241.6; 364/941.7; 364/955.1; 364/960.7; 364/DIG. 1
[58] Field of Search ... 364/200 MS File, 900 MS File

[56] References Cited

U.S. PATENT DOCUMENTS

| | | | |
|---|---|---|---|
| 4,498,136 | 2/1985 | Sproul. III | 364/200 |
| 4,546,431 | 10/1985 | Horvath | 364/200 |
| 4,551,798 | 11/1985 | Horvath | 364/200 |
| 4,586,127 | 4/1986 | Horvath | 364/200 |
| 4,779,187 | 10/1988 | Letwin | 364/200 |
| 4,807,185 | 2/1989 | Kamiya | 364/900 |
| 4,890,221 | 12/1989 | Gage | 364/200 |

OTHER PUBLICATIONS

"Secret 286 LOADALL Instruction Allows Access to Extended Memory In Read Mode," *Microprocessor Report*, vol. 1, No. 2, Oct. 1987.

Primary Examiner—Thomas C. Lee
Assistant Examiner—Ken S. Kim
Attorney, Agent, or Firm—Seed and Berry

[57] ABSTRACT

A method and system for allowing an interrupted computer program to detect the occurrence of an interrupt. In a preferred embodiment, a system according to the present invention allows an Intel 80286-compatible based computer program executing in real mode to detect the occurrence of an interrupt during the execution of a set of instructions. According to a preferred method of the present invention, the LOADALL instruction is used to load the code segment selector with the segment address of the code in the interrupted routine to be executed upon return from an interrupt and to load the code segment base address with the segment base address of the set of instruction during whose execution interrupt is to be detected. A preferred method then executes the set of instructions. Upon occurrence of an interrrupt, the preferred method saves the value in the code segment selector and executes an interrupt routine. Upon return from the interrupt routine, a preferred method loads the code segment base address based on the saved code segment value so that the interrupted routine resumes execution at an instruction other than the interrupted instruction. The methods of the present invention allow a program executing in real mode to access data in extended memory with interrupts enabled.

20 Claims, 10 Drawing Sheets

SEGMENT ADDRESS TRANSLATION REGISTERS

| | 16-BIT SELECTOR | 48-BIT HIDDEN DESCRIPTOR CACHE (PROGRAM INVISIBLE—LOADED BY CPU) | | | |
|---|---|---|---|---|---|
| CS | | | | | CODE SEGMENT REGISTER |
| DS | 0105H | 0AH | 001050H | 1000H | DATA SEGMENT REGISTER |
| ES | | | | | EXTRA SEGMENT REGISTER |
| SS | | | | | STACK SEGMENT REGISTER |

63      48 47      40 39              16 15              0
          ACCESS    SEGMENT BASE    SEGMENT
          RIGHTS    ADDRESS         SIZE

LOADALL BUFFER

Before Interrupt: Inconsistent

SEGMENT ADDRESS TRANSLATION REGISTERS

| | 16-BIT SELECTOR | 48-BIT HIDDEN DESCRIPTOR CACHE (PROGRAM INVISIBLE—LOADED BY CPU) | | | |
|---|---|---|---|---|---|
| CS | | | | | CODE SEGMENT REGISTER |
| DS | 0105H | 0AH | 1024B0H | 1000H | DATA SEGMENT REGISTER |
| ES | | | | | EXTRA SEGMENT REGISTER |
| SS | | | | | STACK SEGMENT REGISTER |
| | 63 | 48 47  40 | 39            16 | 15           0 | |
| | | ACCESS RIGHTS | SEGMENT BASE ADDRESS | SEGMENT SIZE | |

After Interrupt: Consistent

SEGMENT ADDRESS TRANSLATION REGISTERS

| | 16-BIT SELECTOR | 48-BIT HIDDEN DESCRIPTOR CACHE (PROGRAM INVISIBLE—LOADED BY CPU) | | | |
|---|---|---|---|---|---|
| CS | | | | | CODE SEGMENT REGISTER |
| DS | 0105H | 0AH | 001050H | 1000H | DATA SEGMENT REGISTER |
| ES | | | | | EXTRA SEGMENT REGISTER |
| SS | | | | | STACK SEGMENT REGISTER |
| | 63 | 48 47  40 | 39            16 | 15           0 | |
| | | ACCESS RIGHTS | SEGMENT BASE ADDRESS | SEGMENT SIZE | |

Figure 5

SEGMENT ADDRESS TRANSLATION REGISTERS

|    | 16-BIT SELECTOR | 48-BIT HIDDEN DESCRIPTOR CACHE (PROGRAM INVISIBLE--LOADED BY CPU) | | | |
|----|-----------------|----------------|-----------------|-----------------|---|
| CS | 0540H           |                | 005400H         |                 | CODE SEGMENT REGISTER |
| DS |                 |                |                 |                 | DATA SEGMENT REGISTER |
| ES |                 |                |                 |                 | EXTRA SEGMENT REGISTER |
| SS |                 |                |                 |                 | STACK SEGMENT REGISTER |
|    | 63           48 | 47          40 | 39           16 | 15            0 |   |
|    |                 | ACCESS RIGHTS  | SEGMENT BASE ADDRESS | SEGMENT SIZE |   |

SEGMENT ADDRESS TRANSLATION REGISTERS

CS:IP

005400H:IP

```
        rep     movsw              ← instruction to move data
        cli
        move    ax,cs
        dec     ax
        push    ax
        move    ax, exit_address
        push    ax
        retf                       ; restore CS register
        cli
         .
         .
         .                     ←——— 16 memory locations after the "rep
        cli                         movsw" when interrupt returns
        move    ax,cs
        dec     ax
        push    ax
        move    ax, resume_move
        push    ax
        retf                       ; restore CS register
```

Figure 8

SEGMENT ADDRESS TRANSLATION REGISTERS

|    | 16-BIT SELECTOR | 48-BIT HIDDEN DESCRIPTOR CACHE (PROGRAM INVISIBLE-LOADED BY CPU) | | |
|----|---|---|---|---|
| CS | 0541H | | 005410H | | CODE SEGMENT REGISTER |
| DS |  | | 0124B0H | | DATA SEGMENT REGISTER |
| ES | 0520H | | 005200H | | EXTRA SEGMENT REGISTER |
| SS |  | | | | STACK SEGMENT REGISTER |

63    48 47    40 39            16 15           0
         ACCESS   SEGMENT BASE    SEGMENT
         RIGHTS   ADDRESS         SIZE

CS:IP

005410H:IP

```
rep     movsw              ← instruction to move data
cli
move    ax,cs
dec     ax
push    ax
move    ax, exit_address
push    ax
retf                       ; restore CS register
cli
  -
  -
  -                        ← 16 memory locations after the "rep
cli                           movsw" when interrupt returns
move    ax,cs
dec     ax
push    ax
move    ax, resume_move
push    ax
retf                       ; restore CS register
```

METHOD OF RESETTING SEQUENCE OF ACCESS TO EXTENDED MEMORY DISRUPTED BY INTERRUPT PROCESSING IN 80286 COMPATIBLE SYSTEM USING CODE SEGMENT REGISTER

TECHNICAL FIELD

This invention relates generally to a computer method and system for detecting the occurrence of an interrupt and for moving data between memory locations.

BACKGROUND OF THE INVENTION

Computer memory is a relatively fast storage medium in the sense that data stored in computer memory can be accessed quickly. The amount of memory that a CPU can directly access is limited by the CPU address space. A computer system's performance is dependent upon the size of the address space and the amount of memory available. System performance can be improved by using large amounts of memory as a storage medium rather than a disk, which is a relative slow storage medium. System performance can also be improved by increasing the effective address space of the CPU.

Computer systems typically use disk drives to store large amounts of data permanently. A computer system must transfer the disk data from the disk into the computer memory before the CPU can access the disk data. The transfer of data from disk to computer memory is a relatively slow process compared to the transfer of data from one computer memory location to another. When a computer program frequently requests disk data, the CPU may spend significant amounts of time waiting for the data to be transferred from the disk to memory so that it can process the data.

Computer systems often use a technique known as disk caching to improve system performance and minimize this waiting time. In disk caching large blocks of disk data are loaded into memory at one time. When a program actually needs the disk data, then it is copied from memory locations in the disk cache to memory locations within the program The computer's operating system typically manages the disk caching process This relieves the application program from the burden of such management.

System performance is affected by the amount of storage allocated to disk caching. Generally, a large disk cache results in better system performance.

Multi-mode

Newly designed microprocessors may include enlarged memory addressing facilities and revised architecture which result in enhanced capabilities. When such microprocessors are used in new computer systems, they often produce computers which are functionally superior to their predecessors due to these enhanced capabilities. Despite any functional advantages a new computer may have over its predecessors, a computer employing an improved microprocessor may not be a commercial success. Computer programs, sometimes referred to as "software," are microprocessor specific. Therefore, when a computer employing a new microprocessor is introduced into the marketplace, there is generally little or no software which can run on it. Existing software, written for previous microprocessors, is incompatible with the new computer. As a result, sales of such new computers will often be sluggish until consumers see that adequate software is available for the computer. Additionally, consumers with libraries of software for existing computers may be reluctant to purchase new computers which would require them to invest in all new software This problem is often compounded by the fact that software writers and publishers are reluctant to produce software for a new microprocessor until sales of computers incorporating the microprocessor are sufficient to create a relatively large group of potential purchasers of the software. This "wait and see" attitude on the part of both consumers and software writers can jeopardize the success of a new microprocessor and computers using the microprocessor.

Designers of new microprocessors sometimes attempt to solve this problem by designing a new microprocessor such that it will operate in multiple modes. In a first mode, for example, the microprocessor will emulate a prior microprocessor and run existing programs written for the prior microprocessor. In a second mode, the microprocessor will make full use of its enhanced capabilities. Such a design will enable manufacturers of computer system using the microprocessor to advertise that the entire body of existing programs written for the prior microprocessor will run on their computer, thereby (in theory) stimulating computer sales to a point where software writers will begin to write programs designed to run in the new enhanced mode.

One such microprocessor is the Intel 80286, which is manufactured by the Intel Corporation of Santa Clara, Calif. The design and operation of the Intel 80286 is described in detail in a publication entitled "iAPX 286 Programmer's Reference Manual Including the iAPX 286 Numeric Supplement," which is available from the Intel Corporation and is hereby incorporated by reference.

The Intel 80286 (hereinafter "80286") operates in two modes. The first mode, called the "real mode," the 80286 emulates the architecture of Intel's previous 8086, 8088 microprocessor family, which is used in the IBM PC and compatible computers, for example. Thus, computers which incorporate the 80286 microprocessor, such as the IBM PC/AT, can run existing 8086 programs written for the IBM PC and compatible computers.

In a second mode, called the "protected mode," the 80286 architecture provides enlarged memory addressing capability, enhanced multitasking support features, and a sophisticated protection scheme.

Extended Memory

The 8086 processor, which the 80286 emulates in real mode, has an address space of 1M-byte. The 80286 in protected mode has an address space of 16M-byte. Typically, a computer that is based on the 80286, such as the IBM PC/AT, contains more than 1M-byte of memory. In real mode, the memory above 1M-byte is referred to as extended memory and the memory below 1M-byte is referred to as real memory. When emulating the 8086, a processor would normally not access extended memory because it is above the 1M-byte address space.

Figure 1:
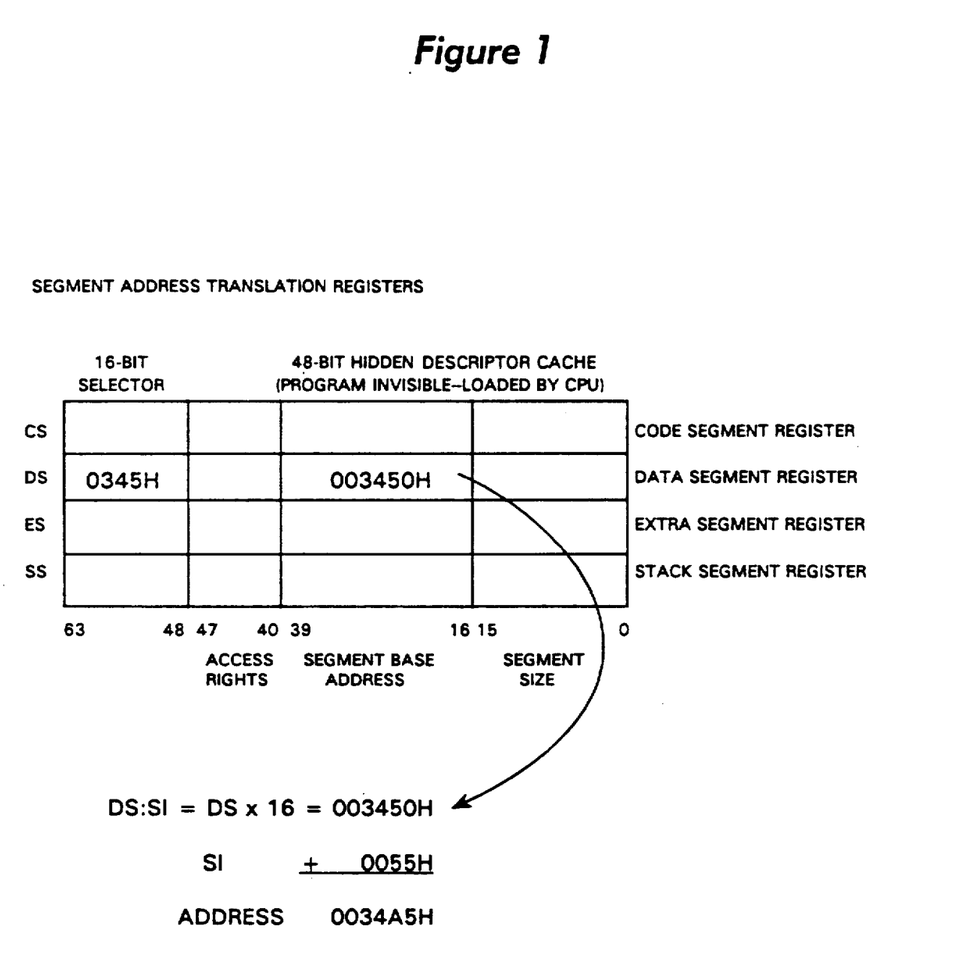
FIG. 1 illustrates a segmentation address scheme.

The 80286 does allow access to extended memory in real mode. The 8086 processor, and thus the 80286 processor in real mode, use a memory segmentation scheme for addressing. The 80286 processor forms addresses by adding a segment base address with a 16-bit offset. The 80286 processor contains four 64-bit Segment Address Translation Registers: code segment (CS), data segment (DS), stack segment (SS), and extra segment (ES). The Segment Address Translation Registers contain a selector and segment base address portion as shown in FIG. 1. The processor also contains several 16-bit registers that are used as 16-bit offsets. To form an address, the processor multiplies the value in the specified selector by 16 to arrive at a segment base address and adds the value in the specified 16-bit offset register to the segment base address. For example, the processor can use the address formed by the DS Register and the 16-bit offset in the SI Register. If the DS Register contains the value 0345H in the selector portion and the SI Register contains the value 0055H then the address, known as DS:SI, is 34A5H (3450H+0055H).

When a selector is loaded, the CPU loads the corresponding segment base address (bit 16 through 39 of the Segment Address Translation Register) with 16 times the value of the selector. For example, when a program loads the DS selector with 0345H, then the CPU loads the DS Segment Base Address for the DS with 3450H. Whenever the CPU forms an address based on a Segment Register, it takes the value from the segment base address portion rather than multiplying the selector by 16 as shown in FIG. 1.

Segmentation allows for the formation of addresses larger than 1M-byte both by the 8086 and, in real mode, by the 80286. For example, when a segment register contains FFFFH and the offset is 0020H, the address is 100010H, which is above 1M-byte. The 8086 forces such addresses above 1M-byte to wrap to low memory, using an operation called "memory wrap." In the case when the address is 100010H, the 8086 will drop the high-order 1 and cause the effective address to be 000010H. The 80286 does not emulate the memory wrap of the 8086. The address would be 100010H on the 80286.

Some programs designed for the 8086 use the memory wrap aspect. Consequently, these programs would not execute correctly on the 80286 in real mode. Makers of computers using the 80286 anticipated this problem. For example, the IBM PC/AT contains circuitry external to the 80286 which effectively allows emulation of the memory wrap. The 80286 initially enters the real mode. The circuitry external to the 80286 logically disconnects the 21st address line (A20) of the 80286 from the memory. When A20 is logically disconnected, or "disabled", the A20 input to the memory is forced to a logical-0. This emulates the memory wrap of the 8086 by forcing the address sent to the memory in the example above to be 000010H rather than 100010H. When A20 is logically connected, the A20 input to the memory is that output from A20 of the CPU. The IBM PC/AT computer also permits the enabling and disabling of A20 under program control.

LoadAll Instruction

Figure 2:
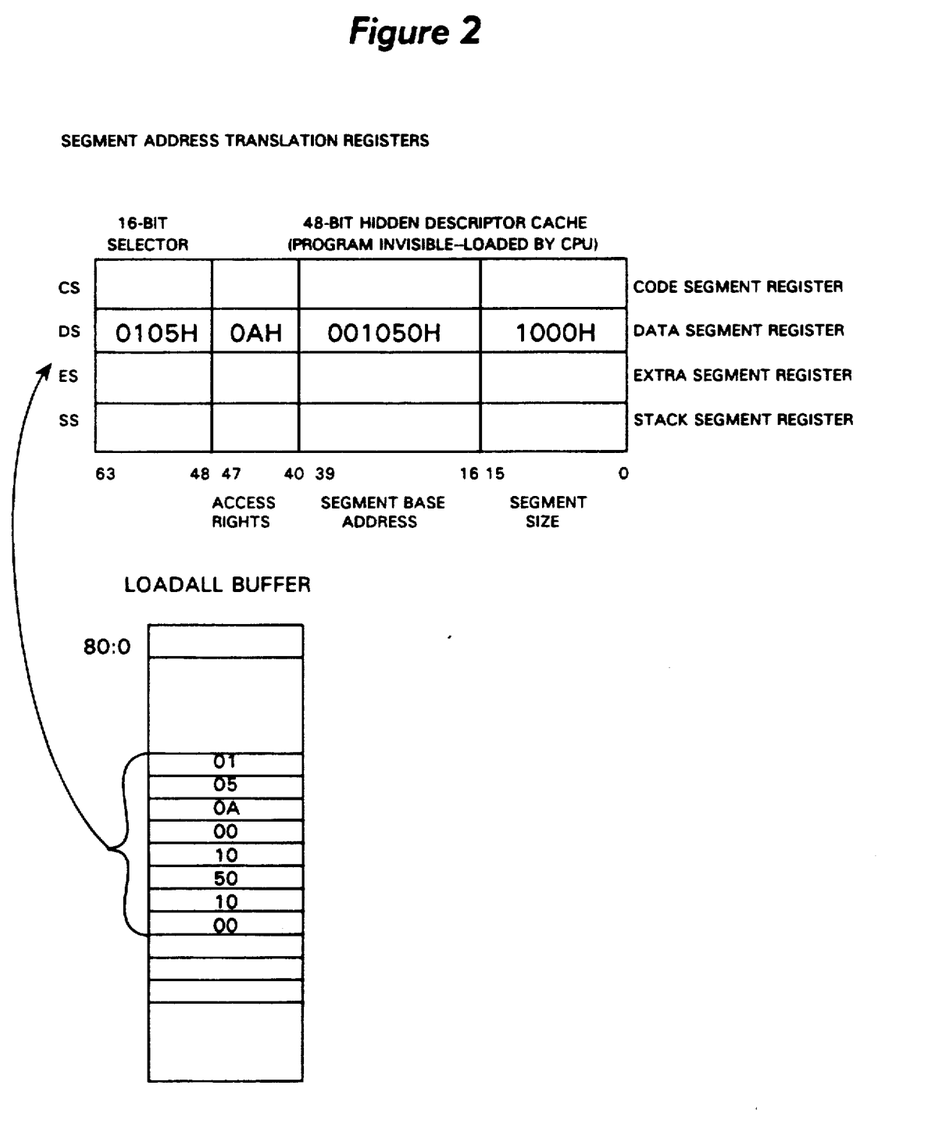
FIG. 2 illustrates the effect of the LoadAll instruction on the DS Register.

The LoadAll instruction is described in "Secret 286 LoadAll Instruction Allows Access to Extended Memory in Real Mode," Microprocessor Report, Volume 1, Number 2, Pages 12-13, October 1987, published by MicroDesign Resources, Inc., 550 California Avenue, Palo Alto, Calif., 94306, which is hereby incorporated by reference. The LoadAll instruction resets the state of the CPU based on 102 bytes of data stored starting at location 80:0. The buffer contains data at predefined locations to be loaded into each register, status word, and descriptor in the CPU. In particular, the LoadAll instruction resets the values in the Segment Address Translation Registers, (that is, CS, DS, SS, ES) based on the data in the buffer at location 80:0. FIG. 2 shows an example of the LoadAll buffer and the contents of the DS Register after execution of the LoadAll instruction.

The LoadAll instruction does not ensure the consistency of the data loaded in the selectors and the corresponding segment base address. To be consistent, a segment base address would be 16 times the corresponding selector.

Figure 3:
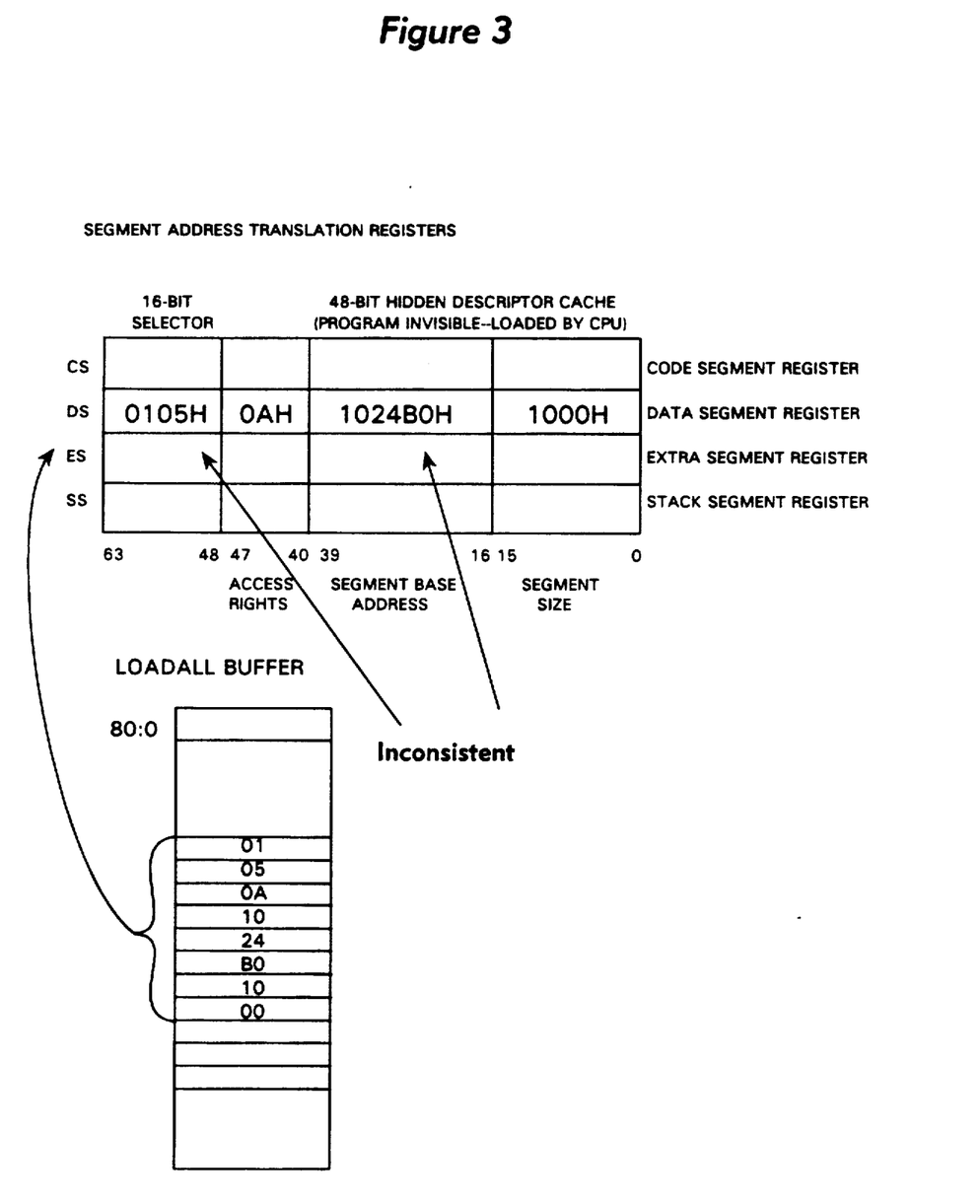
FIG. 3 illustrates the loading of the DS Register with inconsistent data.

As shown in FIG. 3, if the buffer at location 80:0 contains a 0105H at the predefined location for the DS Selector, the predefined location for the DS Segment Base Address could be set to any value, such as 1024B0H, which is not 16 times 0105H. After the LoadAll instruction is executed, the DS Selector contains 0105H and the DS Segment Base Address contains 1024B0H. The CPU is in the anomalous situation where these portions of the DS Register are inconsistent.

Use of Extended Memory for Disk Caching

Several different techniques are available for moving data between real memory and extended memory so as to permit extended memory to be used in disk caching. These techniques can also be used to store in extended memory program data that does not need to be stored on disk. In one technique, the program causes the CPU to switch to protected mode. In protected mode, the CPU can access all the memory in the 16M-byte address space. The CPU moves the data and returns to real mode. The 80286, however, does not provide the capability to switch from protected mode to real mode in an efficient manner. There is considerable overhead with such a switch that may outweigh the benefits of using the extended memory.

Figure 4:
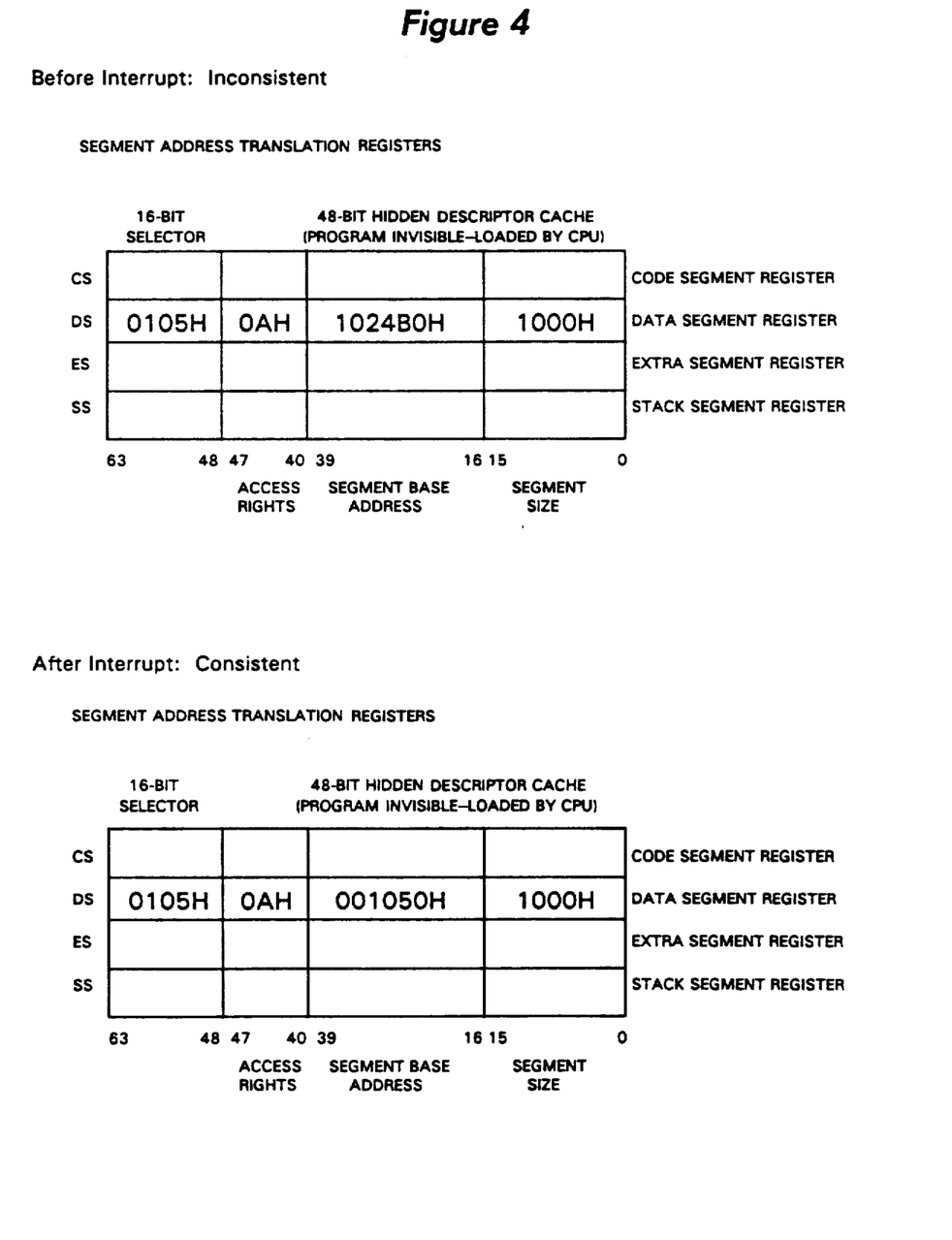
FIG. 4 illustrates the setting of the DS Segment Base Address before and after an interrupt.

In another technique, the program enables A20 so that extended memory can be accessed. The program uses the LoadAll instruction to load the DS Segment Base Address with an address in extended memory. Because the LoadAll instruction is used, the DS Selector and the DS Segment Base Address can be in an inconsistent state. The program then executes a "rep movsw" instruction. The interrupts, however, must be disabled prior to executing the LoadAll instruction. When an interrupt occurs, the CPU saves the value of the DS Selector and changes it to a new value that is appropriate for the interrupt routine. The CPU also changes the DS Segment Base Address based on the new value of the DS Selector. When the interrupt routine returns, the CPU restores the DS Selector to its pre-interrupt value. The CPU does not change the value in the DS Segment Base Address to its pre-interrupt value. Consequently, the DS Segment Base Address no longer points to extended memory. FIG. 4 shows the inconsistent state before the interrupt and the consistent state after the interrupt. The other Segment Address Translation Registers are similarly modified when an interrupt occurs. To make this technique work, the interrupts must be disabled throughout the execution of the "rep movsw".

It is not desirable, however, to have interrupts disabled for long periods of time. A variation of this technique would be to move only small blocks of data (e.g. 128 bytes) at a time with the interrupts disabled. For example, if 1024 bytes of data were to be moved, then a program could divide the move into 8 blocks of 128 bytes each. After the move of each block occurs, the program would enable the interrupts and then proceed to move the next block. The program would need to execute a LoadAll instruction for each block to reset the DS Segment Base Address in case the program was interrupted. The execution of the LoadAll instruction for each block adds considerable overhead to the move.

SUMMARY OF THE INVENTION

It is an object of the present invention to provide an improved method and system for moving data between computer memory locations.

It is another object of the present invention to provide an improved method and system for detecting the occurrence of an interrupt. It is another object to provide such a method and system that allows interrupt detection during the execution of an interruptible instruction such as the repeat instruction ("rep") of the 80286.

It is another object of the present system to allow a 80286 computer program executing in real mode to access data in extended memory while the interrupts are enabled.

These and other objects, which will become apparent as the invention is more fully described below, are obtained by an improved method and system for accessing and moving data in computer memory. In preferred embodiments, the method and system of the preferred embodiment allows efficient access to data stored in extended memory. The LoadAll instruction is used to load the CS Selector and the CS Segment Base Address with inconsistent data. The CS Segment Base Address is loaded with the segment base address of a repeat instruction and the CS Selector is loaded with the segment address of code to be executed after the repeat instruction is interrupted. When an interrupt occurs during the execution of the repeat instruction, execution continues not at the repeat instruction but at the instruction pointed to by the CS Selector and the Instruction Pointer (IP).

In preferred embodiments, the system enables A20 so that extend memory can be accessed. The system uses the LoadAll instruction both to load the address of a segment in extended memory and, so that an interrupt can be detected, to load the CS Selector and the CS Segment Base Address. The system then executes a repeat instruction to effect the move of the data.

DETAILED DESCRIPTION OF THE INVENTION

The present invention is perhaps best understood with reference to a preferred embodiment comprising a system using the Intel 80286 processor. This system allows a program to recognize when an interrupt occurs during the execution of the "rep movsw" instruction while data is moved between extended memory and real memory on an 80286 executing in real mode. The present system sets the CS Selector and the CS Segment Base Address to an inconsistent state. The system loads the CS Segment Base Address with the base address of the current code segment, which is 16 times the value in the CS Selector. The system loads the CS Selector with its current value plus one. This loading is accomplished through execution of the LoadAll instruction. The system also loads the DS Segment Base Address (or the ES Segment Base Address if data is to be moved to extended memory) with the address of the segment in extended memory for the data to be moved to real memory. This loading is accomplished by execution of the same LoadAll instruction that loads the CS Register. The system then executes a "rep movsw" instruction to move the data between extended and real memory, with the interrupts enabled. If an interrupts occurs during the "rep movsw" instruction, the CPU will restore the CS Selector to its pre-interrupt value when the interrupt routine returns. This restoring will cause the CPU to set the CS Segment Base Address to 16 times the pre-interrupt value of the CS Selector This causes the return address from the interrupt (CS:IP) to be 16 memory locations greater than the location of the "rep movsw" instruction.

The system has interrupt processing code placed at the post-interrupt CS:IP address to handle the occurrence of an interrupt. The interrupt processing code is executed upon completion of the interrupt routine that processes the interrupt. This code restores the CS Register to the value it had before the LoadAll instruction was executed. The system then loops back so that the LoadAll instruction will be executed again and the "rep movsw" instruction will be executed again to complete the move between extended and real memory. This is repeated for each interrupt that occurs during the execution of the repeat instruction.

Figure 5:
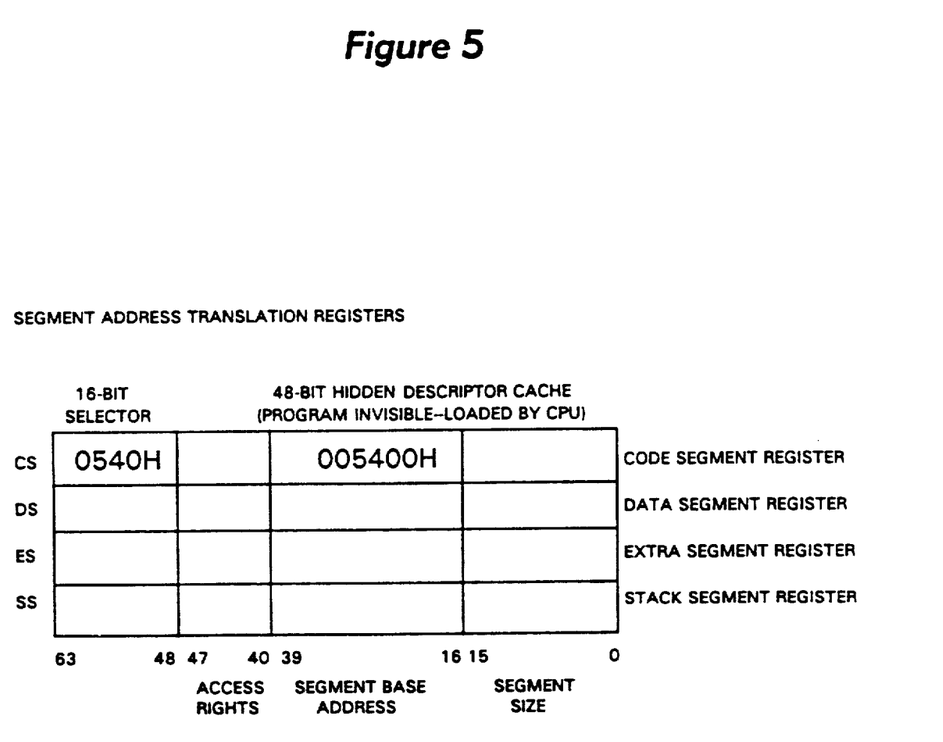
FIG. 5 illustrates the CS Register in a consistent state.
Figure 6:
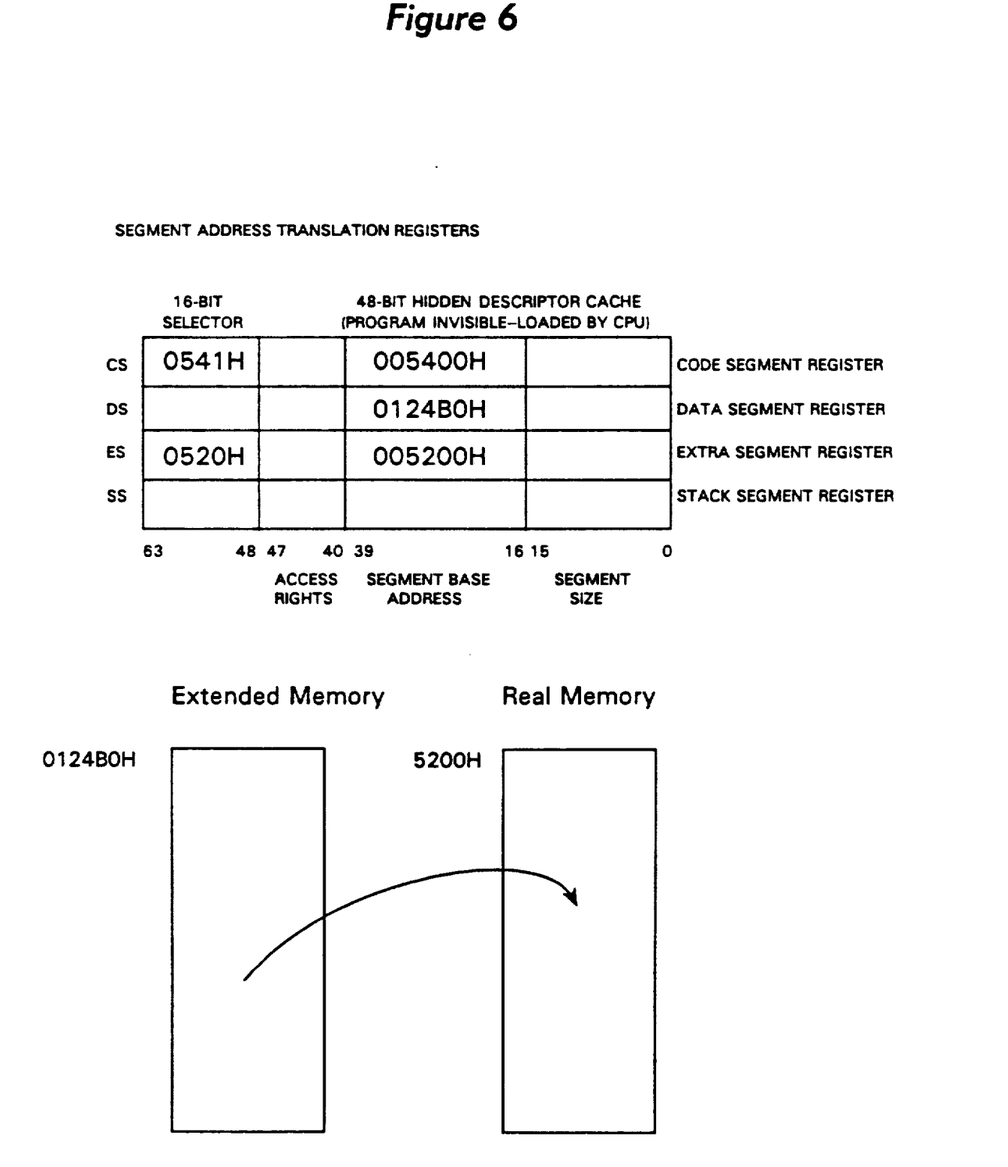
FIG. 6 illustrates the loading of the Segment Address Translation Registers to effect the detection of an interrupt while data is moved from extended memory.
Figure 9:
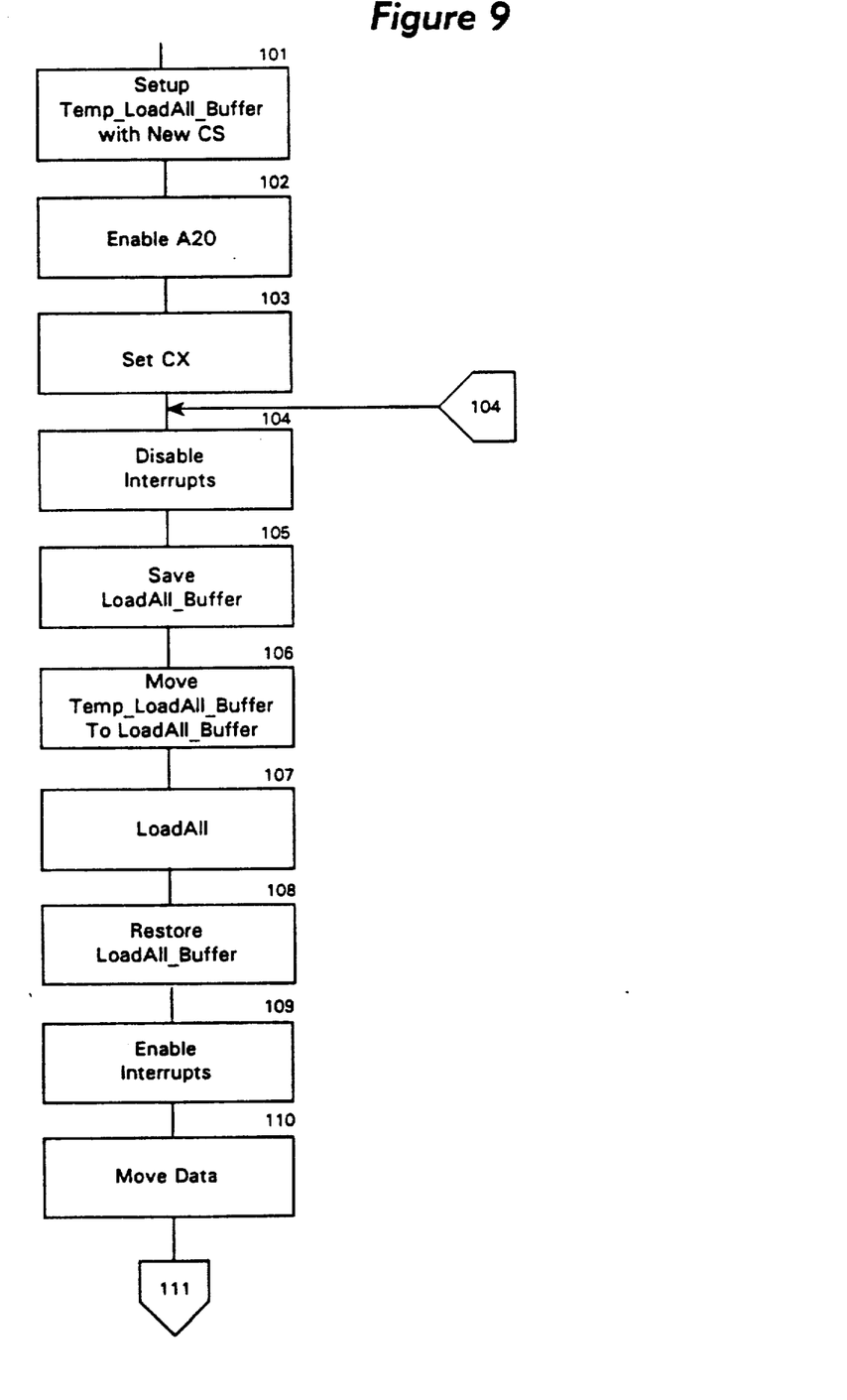
FIG. 9 illustrates a flowchart of a preferred embodiment of the present invention.

FIG. 9 shows a flowchart of the system. In block 101, the system initializes a Temporary LoadAll Buffer, which will later be moved to location in 80:0 for the LoadAll instruction. The system initializes each of the locations in the buffer registers, descriptor tables, and status words. In particular, the locations corresponding to the CS Selector is set to the current value of the CS Selector plus 1. If data is to be moved from extended memory, the location corresponding to the DS Segment Base Address is loaded with the segment base address of the data in extended memory. If the data is to be moved to extended memory, the location corresponding to the ES Segment Base Address is loaded with the segment base address of the data in the extended memory. Both the DS and ES Segment Base Address can be loaded with an address in extended memory to effect an inter-extended memory move. As an example, FIG. 5 shows the contents of the Segment Address Translation Registers before the execution of the LoadAll instruction. FIG. 6 shows the registers after execution of the LoadAll instruction. The CS Register is in an inconsistent state and the DS Segment Base Address points to extended memory and the DS Selector can be any value.

In block 102, the system enables address line 20 (A20). With A20 enabled in real mode, the processor can access memory located above 1M-byte. In block 103, the system loads the CX Register with the count of the words to be moved between extended memory and real memory.

Since the LoadAll instruction retrieves its information from location 80:0, the system moves the Temporary LoadAll Buffer to location 80:0. In some versions of DOS, the DOS uses the memory following location 80:0 as an internal DOS buffer not related to the LoadAll instruction. This system ensures that execution of the LoadAll instruction does not corrupt this DOS buffer. To ensure that DOS does not access the buffer while the LoadAll information is there, the system disables the interrupts and does not enable the interrupts until the LoadAll instruction has been executed and the DOS buffer restored.

In block 104, the system disables the interrupts. In block 105, the system moves data from the DOS buffer at location 80:0 to a Temporary DOS Buffer. In block 106, the system moves the data from the Temporary LoadAll Buffer to the buffer at location 80:0. In block 107, the system executes the LoadAll instruction, which initializes the Segment Address Translation Registers. In block 108, the system restores the Temporary DOS Buffer to location 80:0. In block 109, the system enables the interrupts.

Figure 7:
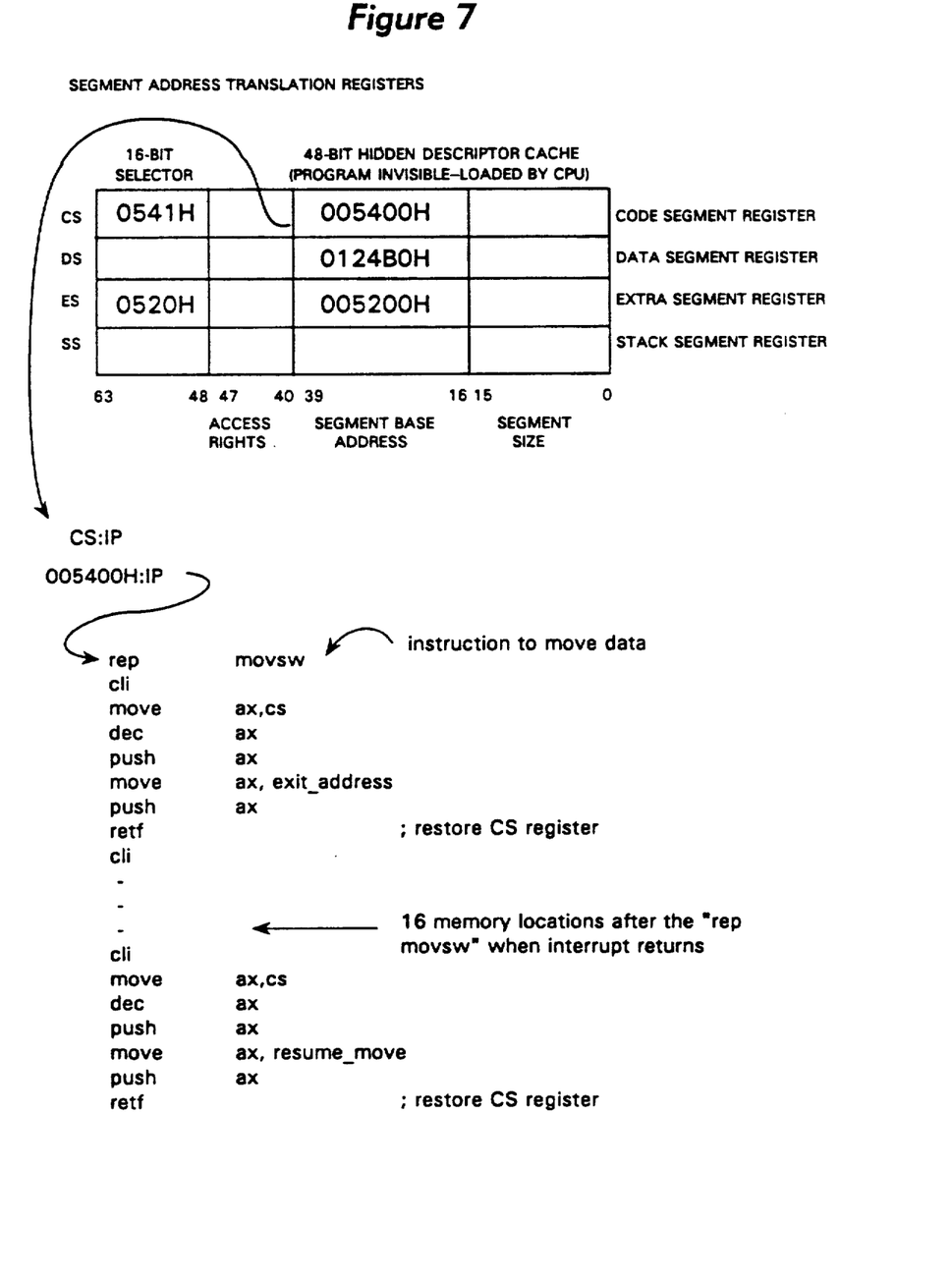
FIG. 7 illustrates that the CS Segment Address Base is inconsistent with the CS Selector during execution of the "rep movsw" instruction.
Figure 8:
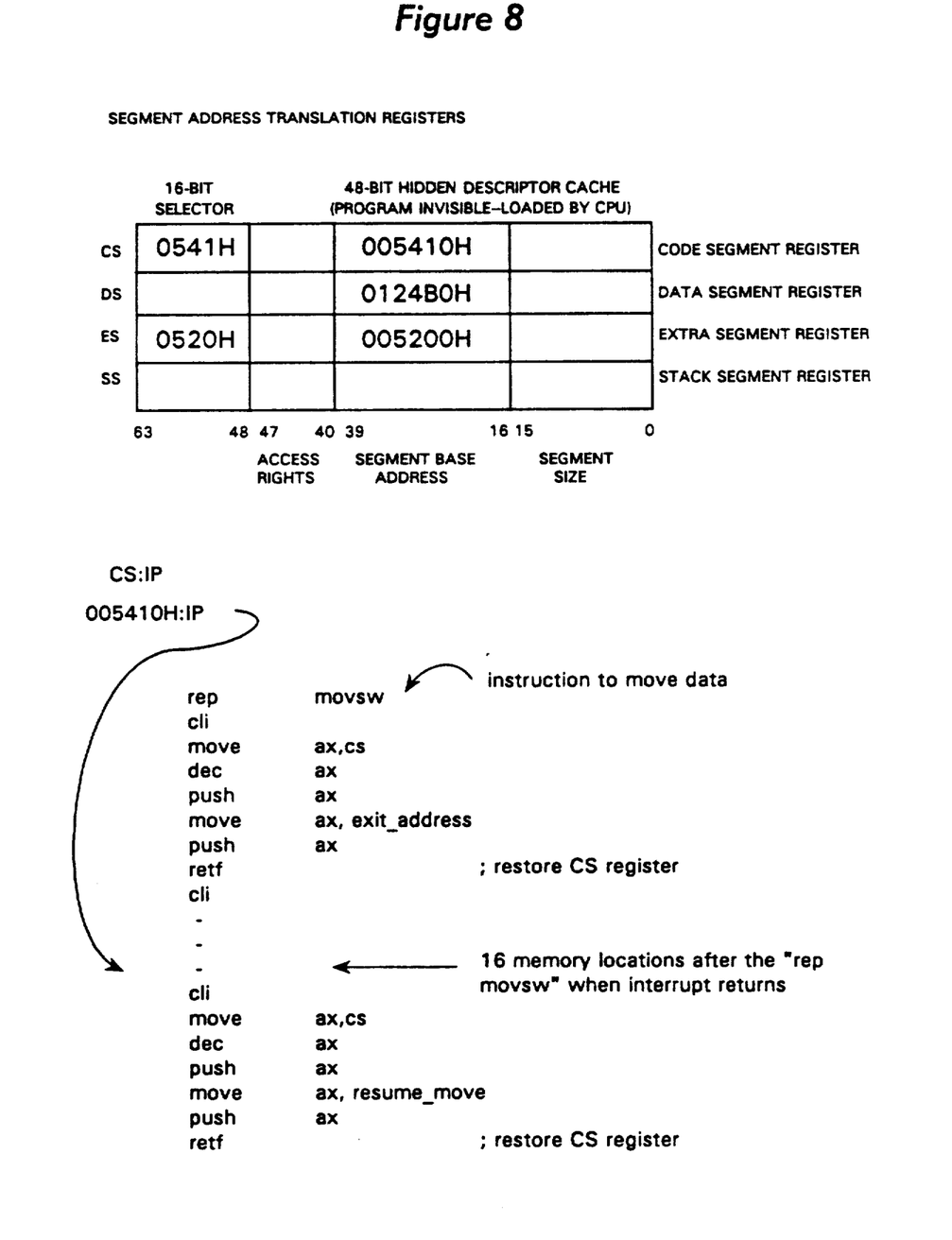
FIG. 8 illustrates that present invention causes a return from the interrupt to a location different than the interrupted instruction.

In block 110, the system executes the "rep movsw" instruction to move the data between extended memory and real memory. If an interrupt occurs during the execution of the "rep movsw" instruction, then the system continues execution at block 117, otherwise the "rep movsw" instruction completes execution and the system continues at block 112. FIG. 7 shows that the CS:IP points to the "rep movsw" instruction and that the CS Selector points to a location 16 address locations higher than the CS Segment Base Address. FIG. 8 shows that the CS:IP points to the location 16 bytes after the "rep movsw" instruction on return from the interrupt. The first instruction executed on return is a clear interrupt instruction.

In block 112, the system disables the interrupts. In block 113, the system restores the CS Register to the unmodified segment base address by subtracting one from it. In block 114, the system enables the interrupts. In block 115, the system disables A20. In block 116, the move from extended memory is complete and the system returns to the calling routine.

The system enters block 117 upon return from an interrupt occurring during the execution of the "rep movsw" instruction that was moving the data between extended memory and real memory. In block 117, the system disables the interrupts. In block 118, the system restores the CS Register to the unmodified segment address by subtracting one from it. In block 119, if the CX Register is zero, then the move is complete and the system continues at block 112, otherwise the system loops to block 104 to again use the LoadAll instruction and the "rep movsw" instruction to complete the move from extended memory to real memory.

Although a preferred embodiment moves data between extended and real memory, the system can be used as a general method for accessing data located in extended memory. For example, the "repne cmpsw" instruction can be used to find matching words in extended memory.

A preferred embodiment can also be used to detect the occurrence of an interrupt during execution of a set of instructions rather than during the execution of just one interruptible instruction. The interrupt processing code that is executed when the interrupt routine returns determines at which instruction in the set of instructions to resume.

Although the present invention has been described in terms of preferred embodiments, it is not intended that the invention be limited to these embodiments. Modifications within the spirit of the invention will be apparent to those skilled in the art. The scope of the present invention is defined by the claims which follow.

I claim:

1. A method of detecting the occurrence of an interrupt during the execution of a set of instructions on a processor with a code segment selector register and a code segment base address register, the method comprising the steps of:
   loading the code segment selector register with the segment address of interrupt processing code to be executed upon completion of an interrupt routine;
   loading the code segment base address register with the segment base address of the set of instructions;
   executing the set of instructions;
   upon the occurrence of an interrupt during the execution of the set of instruction, saving the value of the code segment selector register and executing an interrupt routine; and
   upon return from the executed interrupt routine, loading the code segment base address register based on the saved value of the code segment selector register so that the interrupt processing code is executed.

2. The method of claim 1 wherein the processor is an Intel 80286.

3. The method of claim 1 wherein the processor is compatible the Intel 80286.

4. The method of claim 1 wherein the set of instructions includes an interruptible instruction.

5. The method of claim 4 wherein the interruptible instruction is a repeat instruction.

6. A method of accessing data in extended memory with interrupts enabled on an Intel 80286-compatible based computer with A20 enabled, the method comprising the steps of:
   disabling the interrupts;
   loading the portion of the LoadAll Buffer corresponding to the CS Selector with the segment address of code to be executed when an interrupt occurs during execution of code that accesses extended memory;
   loading the portion of the LoadAll Buffer corresponding to the CS Segment Base Address with the segment base address of the code segment of the code that accesses extended memory;
   loading the portion of the LoadAll Buffer corresponding to a non-CS Segment Base Address with the segment base address of the data to be accessed in extended memory;
   executing the LoadAll instruction;
   enabling the interrupts;
   executing the code that accesses extended memory;
   upon occurrence of an interrupt during the execution of the code that accesses extended memory, saving the value of the CS Selector;

executing an interrupt routine;
upon return from the interrupt routine.
loading the CS Segment Base Address based on the saved CS Selector value; and
executing instructions to reset the state of the CPU so that the execution of the interrupted code that accesses extended memory can be continued.

7. The method of claim 6 wherein the code that accesses the extended memory is the repeat instruction.

8. The method of claim 6 wherein the code that accesses extended memory consists of a set of instructions.

9. A method in a computer system, supporting interrupts and having predetermined system interrupt routines to process the interrupts, of returning from the execution of an interrupt routine at an alternate location that is other than the interrupted location, the method comprising the steps of:
loading a register with a value indicating the address of the alternate location;
storing interrupt processing code to be executed upon return from the interrupt routine at the alternate location;
executing a set of instructions; and
upon occurrence of an interrupt,
executing a system interrupt routine; and
upon completion of a system interrupt routine, returning to the alternate location thereby executing the interrupt processing code.

10. The method of claim 9 wherein the computer system is based upon an Intel 80286-compatible processor and the register is the code segment register, and wherein the step of loading the register further comprises the steps of:
loading the portion of the LoadAll Buffer corresponding to the CS Selector with the segment address of the alternate location; and
executing the LoadAll instruction thereby loading the CS Selector with the segment address of the alternate location.

11. An apparatus for detecting an occurrence of an interrupt during the execution of a set of instructions on a processor with a code segment selector register and a code segment base address register comprising:
means for loading the code segment selector register with the segment address of interrupt processing code to be executed upon completion of an interrupt routine;
means for loading the code segment base address register with the segment base address of the set of instruction;
means for executing the set of instructions;
means for, upon the occurrence of an interrupt during the execution of the set of instructions, saving the value of the code segment selector register and executing an interrupt routine; and
means for, upon return from the executed interrupt routine, loading the code segment base address register based on the saved value of the code segment selector register so that the interrupt processing code is executed.

12. The apparatus of claim 11 wherein the processor is an Intel 80286.

13. The apparatus of claim 11 wherein the processor is compatible the Intel 80286.

14. The apparatus of claim 11 wherein the set of instructions includes an interruptible instruction.

15. The apparatus of claim 14 wherein the interruptible instruction is a repeat instruction.

16. An apparatus for accessing data in extended memory with interrupts enabled on an Intel 80286-compatible based computer with A20 enabled comprising:
means for disabling the interrupts;
means for loading the portion of the LoadAll Buffer corresponding to the CS Selector with the segment address of code to be executed when an interrupt occurs during execution of code that accesses extended memory;
means for loading the portion of the LoadAll Buffer corresponding to the CS Segment Base Address with the segment base address of the code segment of the code that accesses extended memory;
means for loading the portion of the LoadAll Buffer corresponding to a non-CS Segment Base Address with the segment base address of the data to be accessed in extended memory;
means for executing the LoadAll instruction;
means for enabling the interrupts;
means for executing the code that accesses extended memory;
means for, upon occurrence of an interrupt during the execution of the code that accesses extended memory,
saving the value of the CS Selector;
executing an interrupt routine; and
upon return from the interrupt routine,
loading the CS Segment Base Address based on the saved CS Selector value; and
executing instructions to reset the state of the CPU so that the execution of the interrupted code that accesses extended memory can be continued.

17. The apparatus of claim 16 wherein the code that accesses the extended memory is the repeat instruction.

18. The apparatus of claim 16 wherein the code that accesses extended memory consists of a set of instructions.

19. An apparatus based upon a computer system, supporting interrupts and having predetermined system interrupt routines to process the interrupts, for returning from the execution of an interrupt routine at an alternate location that is other than the interrupted location comprising:
means for loading a register with a value indicating the address of the alternate location;
means for storing interrupt processing code to be executed upon return from the interrupt routine at the alternate location;
means for executing a set of instructions; and
means for, upon occurrence of an interrupt,
executing the interrupt routine; and
upon completion of the interrupt routine, returning to the alternate location thereby executing the interrupt processing code.

20. The apparatus of claim 19 wherein the computer system is based upon an Intel 80286-compatible processor and the register is the code segment register, and wherein the means for loading the register further comprises:
means for loading the portion of the LoadAll Buffer corresponding to the CS Selector with the segment address of the alternate location; and
means for executing the LoadAll instruction thereby loading the CS Selector with the segment address of the alternate location.

* * * * *

UNITED STATES PATENT AND TRADEMARK OFFICE
CERTIFICATE OF CORRECTION

PATENT NO. : 5,125,087
DATED : June 23, 1992
INVENTOR(S) : Scott A. Randell

It is certified that error appears in the above-indentified patent and that said Letters Patent is hereby corrected as shown below:

In column 8, claim 3, line 40, after "compatible" please insert -- with --.

In column 9, claim 11, line 52, please delete "instruction" and substitute therefor -- instructions --.

In column 9, claim 13, line 66, after "compatible" please insert -- with --.

Signed and Sealed this

Third Day of August, 1993

Attest:

MICHAEL K. KIRK

*Attesting Officer*  *Acting Commissioner of Patents and Trademarks*